W. B. CHAPMAN.
GAS PRODUCER.
APPLICATION FILED AUG. 5, 1915.

1,341,044. Patented May 25, 1920.
5 SHEETS—SHEET 1.

WITNESSES:
A. Hitzwoges
Patrick G. Bolger

INVENTOR
William B. Chapman
BY
Dace B. Ovens
ATTORNEY

W. B. CHAPMAN.
GAS PRODUCER.
APPLICATION FILED AUG. 5, 1915.

1,341,044.

Patented May 25, 1920.
5 SHEETS—SHEET 2.

WITNESSES:

INVENTOR
William B. Chapman
ATTORNEY

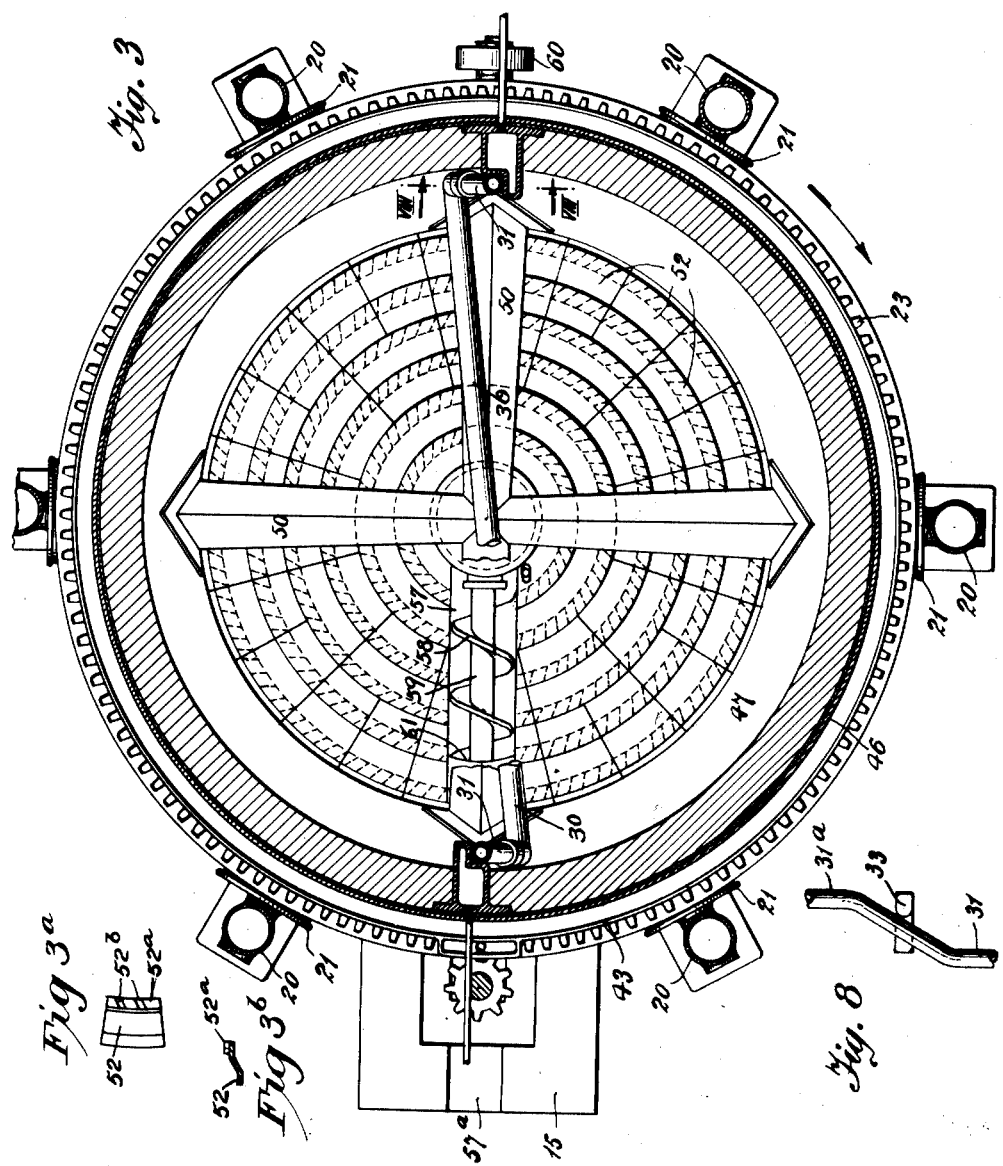

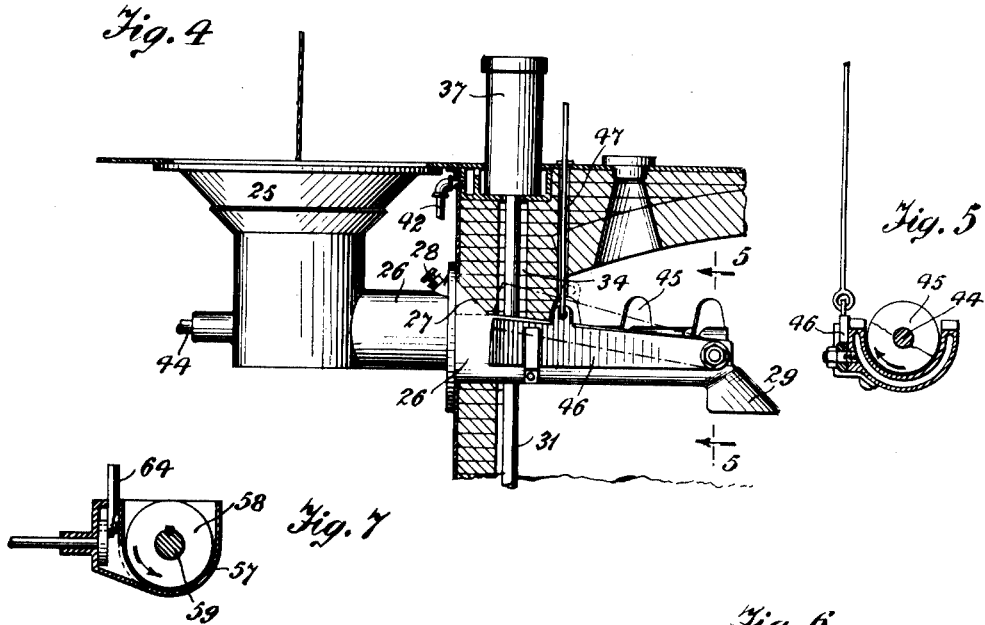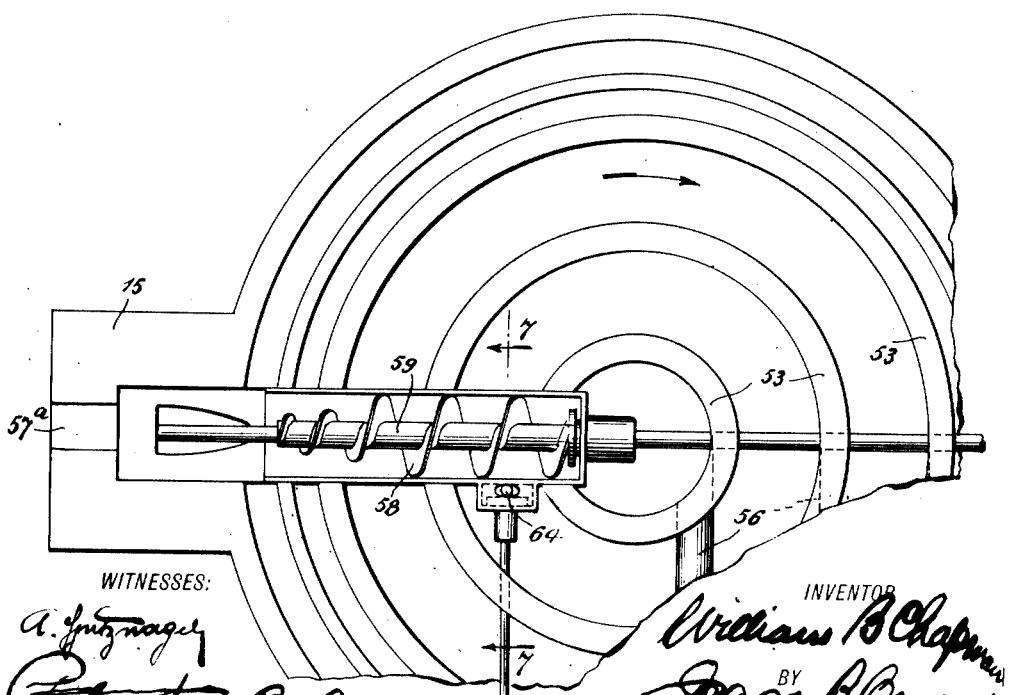

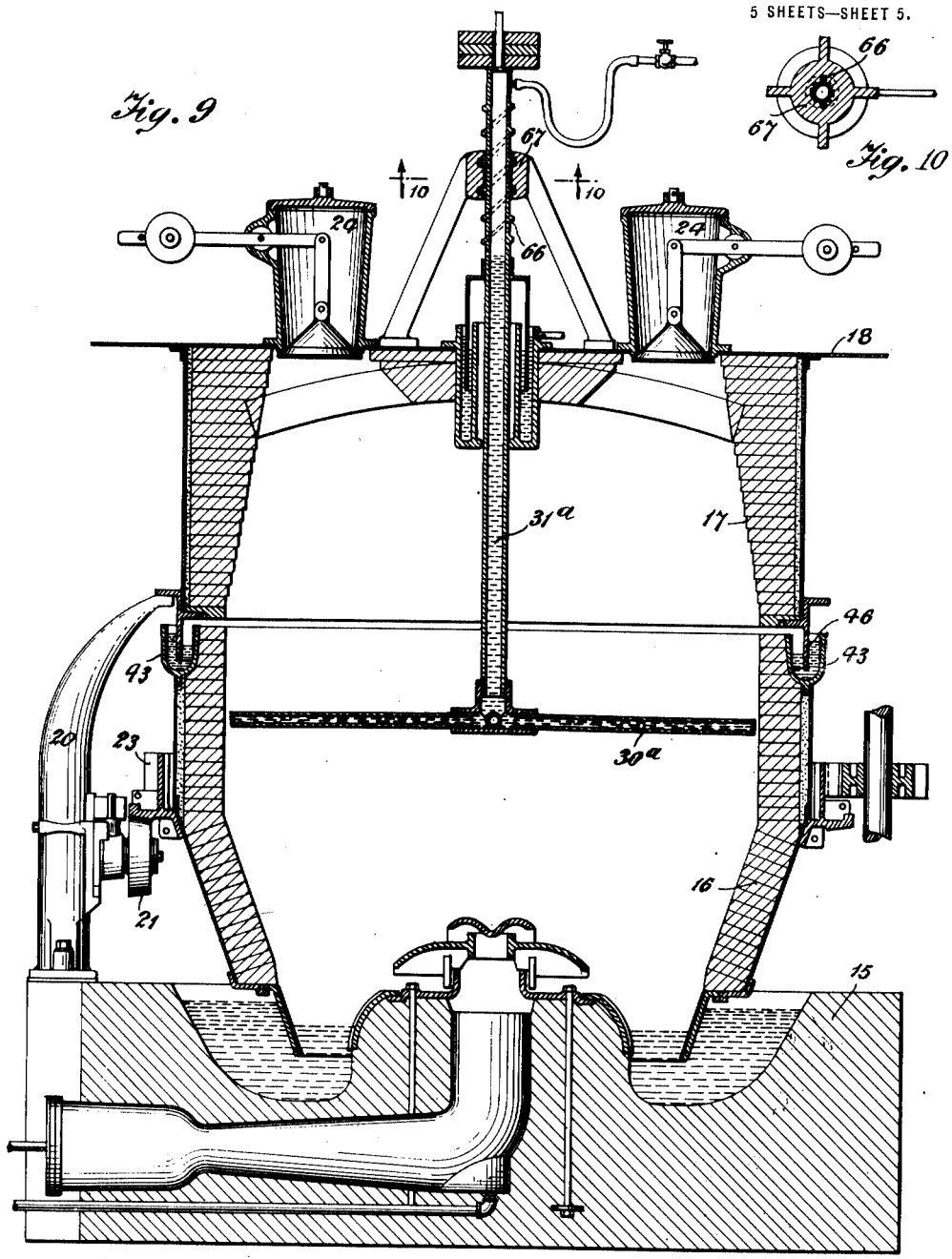

UNITED STATES PATENT OFFICE.

WILLIAM B. CHAPMAN, OF MOUNT VERNON, OHIO, ASSIGNOR TO CHAPMAN ENGINEERING COMPANY, OF MOUNT VERNON, OHIO, A CORPORATION OF NEW YORK.

GAS-PRODUCER.

1,341,044.   Specification of Letters Patent.   Patented May 25, 1920.

Application filed August 5, 1915. Serial No. 43,723.

*To all whom it may concern:*

Be it known that I, WILLIAM B. CHAPMAN, a citizen of the United States, and a resident of Mount Vernon, State of Ohio, have invented certain new and useful Improvements in Gas-Producers, of which the following is a description in such full, clear, and exact terms as will enable any person skilled in the art to which it pertains to make and use the same.

My invention relates to improvements in gas producers which have for their primary object to increase generally the mechanical efficiency of the machine and to make possible a rotary producer of a larger diameter than ordinarily, thus providing for the better treatment of the coal and ash throughout the operation and therefore higher efficiency of gasification.

To this end the invention consists in various novel features of construction and combination of parts which will be fully set forth hereinafter and particularly pointed out in the claims.

The accompanying drawings show as examples the preferred embodiments of my invention. In these drawings:—

Fig. 3 is a sectional plan on the line 3—3 of Fig. 1, certain parts being cut away to show the relatively large opening through the grate.

Fig. 3ᵃ is a bottom view of one of the plates forming the grate.

Fig. 3ᵇ is a central section of the plate shown in Fig. 3ᵃ.

Fig. 4 is a sectional elevation of the feeder.

Fig. 5 is a cross section on the line 5—5 of Fig. 4.

Fig. 6 is a fragmentary plan of the bed on foundation of the producer showing the air distribution and the ash removal means.

Fig. 7 is a cross section on the line 7—7 of Fig. 6.

Fig. 8 is detail view showing the guide for the U-shaped agitator.

Fig. 9 is a view showing another way of mounting the agitator, and

Fig. 10 is a cross section on the line 10—10 of Fig. 9.

Figure 1:
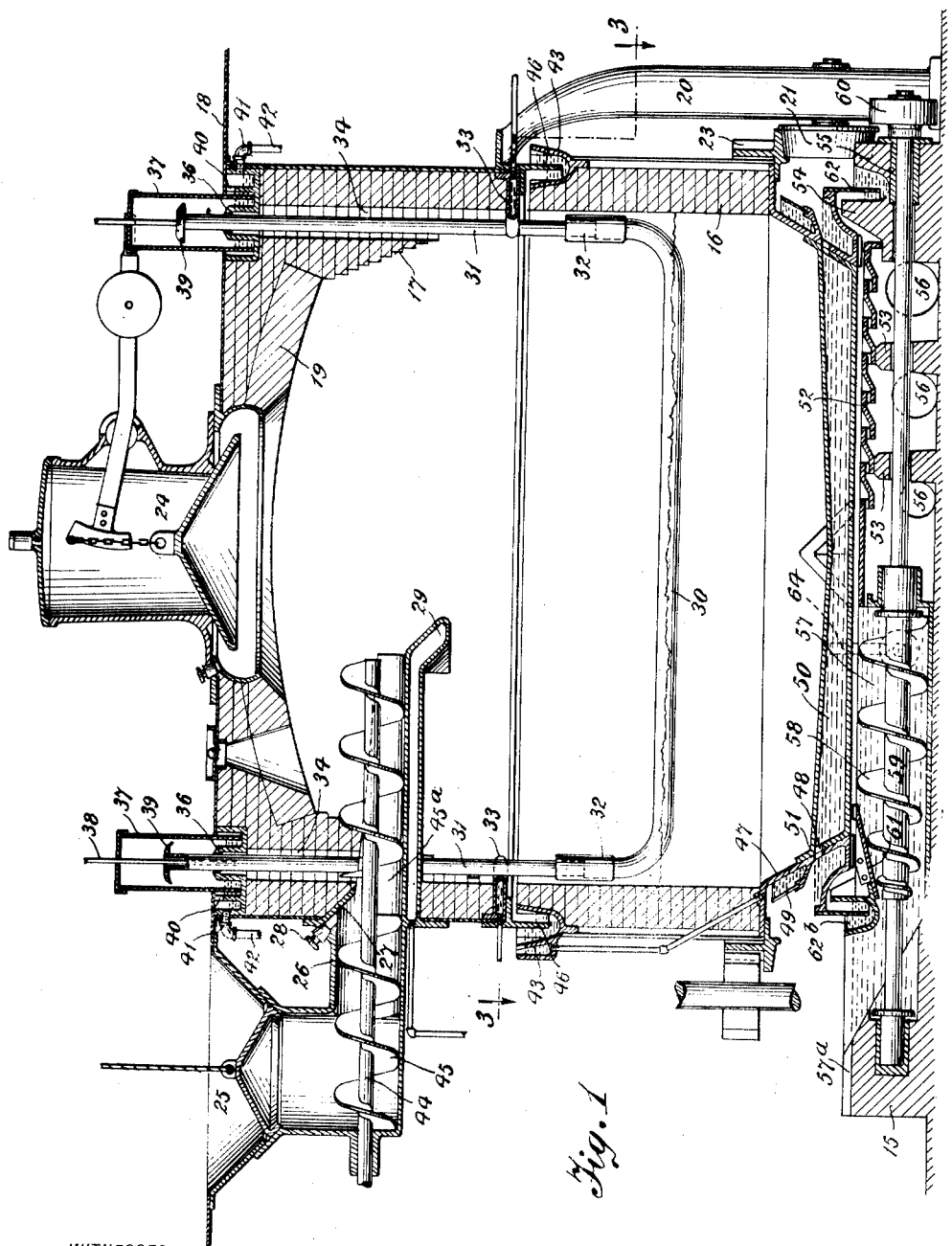
Figure 1 is a vertical section of the producer.
Figure 2:
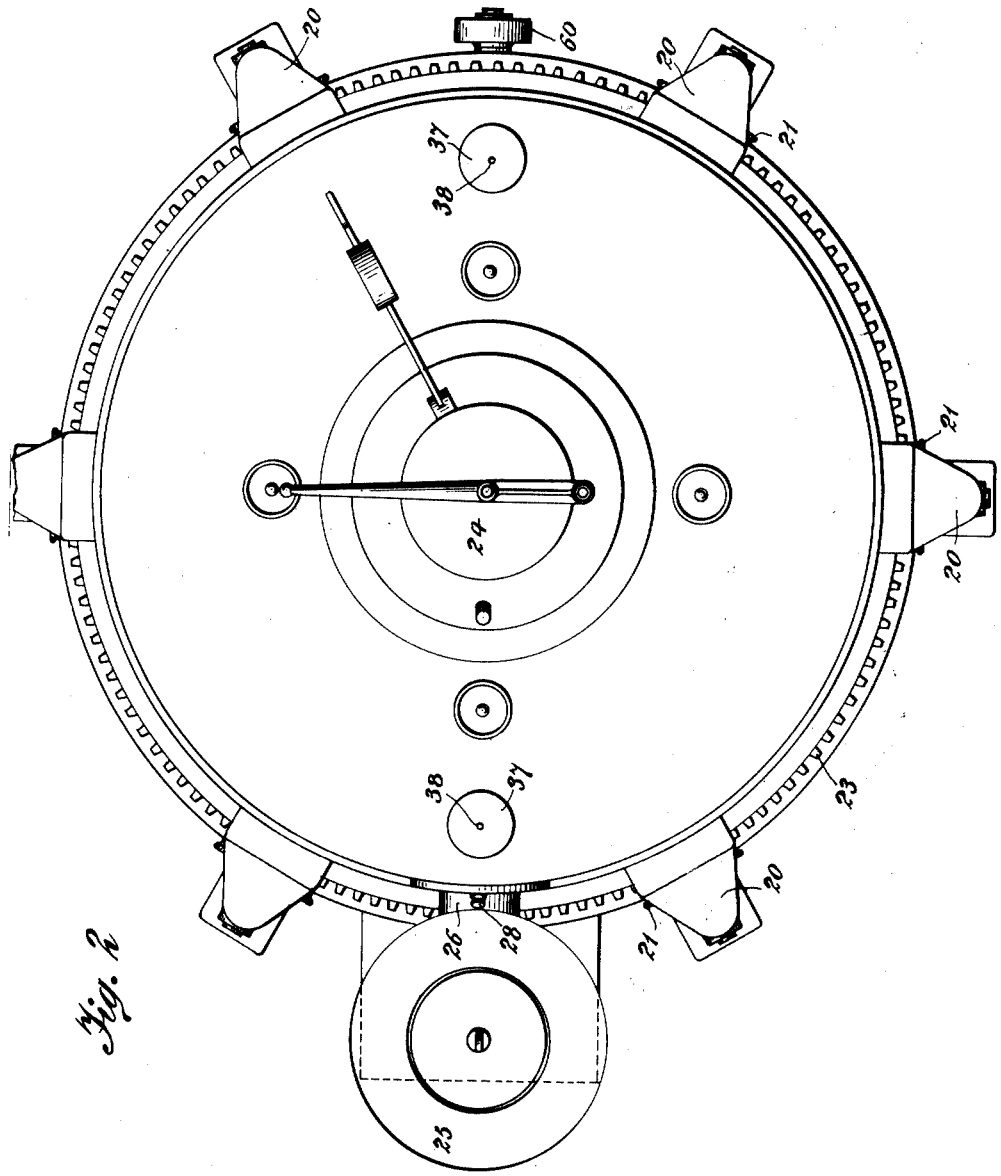
Fig. 2 is a plan view.

Referring to Fig. 1, 15 represents the base of the producer: the vertical wall of the producer is circular and divided horizontally into a rotary lower section 16 and stationary upper section 17 over the latter of which a floor 18 and top 19 extend. The upper section 17 is supported by a number of pillars 20 and the rotary section 21 is supported on rollers with a spur 23 at the bottom part of the lower section 16. 24 is the usual charging hopper and bell centrally located in the top 19.

I employ an additional charger which may be used with or independently of the hopper 24. This charger comprises a hopper and bell 25 sunken in the floor 18 with a conveyer trough 26 running horizontally into and through the wall of the upper section 17. Within the producer the trough 26 is open at its top as well as at its end and has a partial closure or obstruction 27 in its upper part at the point of the wall 17 over which is an opening and plug 28 for a poker. At the inner end of the trough 26 a semi-circular spreader 29 is formed so that the coal falls loosely over as large an area as possible.

The trough 26 of the feeder has a revolubly driven shaft 44 extending through it and this furnished with a screw blade 45 which is broken at 45ᵃ under the pokehole 28. The screw 45 by its rotation advances the coal through the throat 26 and at the break 45ᵃ the coal piles up against the dam 27 filling and sealing the throat so that when the bell 25 is opened the gas will not escape. But the rotation of the screw causes the steady feeding of the coal notwithstanding the break in the screw. A poker (not shown) inserted through the pokehole 28 may be operated manually to break down the dam or arch of coal at the gap 45ᵃ in the screw 45 in event the coal should pack too tightly at this point. As shown best in Figs. 4 and 5 the top of the throat 26 within the producer is open and at one side is a spill board 46 pivoted at its inner end and adjustable vertically by a rod and suitable fastening attachments 47. The screw 45, rotating in the direction of the arrow in Fig. 5 will cause the coal to pile up at the side on which the spill board is located and by adjusting the spill board vertically, the distribution may be regulated throwing more or less coal into the central portion of the producer or toward the wall thereof as desired.

The coal lies in the lower rotating section 16 at approximately the level indicated by the broken line in Fig. 1, and I employ an agitator 30 to roil the top portion or the top surface of the coal. This agitator 30 is preferably furnished with limbs 31 giving the device a U-shaped form. These limbs are joined to the agitator proper by couplings 32 which allow the parts to be easily removed from the producer, new parts to be fitted and also allow the agitator proper 30 to be made of larger diameter or of different shape than the limbs to secure the necessary amount of effect on the coal. The agitator is held stationary, or practically so, against rotary motion and the coal in the lower section 16 rotates against it (the relation may of course be reversed) and in this way the agitator roils or stirs the top of the coal. The agitator is never intended to plow deeply through the body of the coal or its lower portion, but may be made to descend into the coal to any moderate extent by proper adjustment and proportioning of the parts. Its effect is to keep the surface of the coal level and loosened, fill up blow holes and to prevent the formation and accumulation of agglomerations or cakes in the coal during the distillation period of gas making.

The limbs 31 of the agitator are crooked oppositely to each other as shown best at 31ᵃ in Fig. 8, and bear against stops 33 (which may be water cooled) secured in the lower part of the stationary top section 17. These stops 33 brace the agitator and its limbs against the twisting effort and the crooks 31ᵃ serve to prevent cramping of the limbs against the stops 33 and insure free vertical movement of the agitator, notwithstanding the twisting strain thereon. The limbs 31 play vertically in channels 34 in the lining of the upper section 17 of the producer, and at the top of the producer the limbs extend through metal guides 36 and inclosed in housings 37, allowing free vertical motion of the agitator. 38 represents a water pipe which enters one limb 31 (both the limbs and the agitator proper 30 are hollow) by which water is caused to circulate through the limbs and agitator and overflow from the other limb. At the upper ends of the limbs they are furnished with circular lips 39 which prevent the water from trickling down the sides of the pipes and reaching the fire through the guides 36 and channels 34.

The guides 36 stand up in the bottoms of the housings 37 so that water may collect in the housings without passing through the guides and this water overflows through openings 40 to chambers 41 in the producer top from whence it is carried away by pipes 42. These pipes lead to annular water-seal cups 43 in the top of the lower section 16, the cups receiving a skirt 46 depending from the upper section 17, making in this way, a water seal between the producer section.

At the bottom of the producer section 16 is an open bottom inwardly tapering bosh or ash hopper 47 of metal furnished on its lower edge with an outwardly located annular water cup 48 and, above this, with an annular water chamber or cup 49 receiving from a pipe 50 which leads from the cup 43. The water flows from the cup 49 to the cup 48 and protects the hopper 47 after which it enters the ash beams 50 through openings 51 in the skirt or hopper. The ash beams have flat bottoms and inclined upper sides and their ridges or upper edges incline upward toward the ends, so that steam pockets will not form. The ash beams are here shown as four in number, arranged as a Greek cross with inter-communication at the center and they sweep over the bottom of the producer. These ash beams need not, of course, be of the exact form shown; it is only essential that they are of such number and form that they cause the entire ash bed to sweep over the grate, which will now be described.

At the bottom of the producer and extending clear across it is a flat grate formed of a number of bent metal plates 52, having projecting plugs 52ᵃ separated by draft openings 52ᵇ, which overlap alternately under and over each other like tiles in a roof and are so formed in their engaging edges as to provide passages between them, so that the draft current may pass, (see section lines Fig. 1 and dotted lines Fig. 3). These plates 52 are supported on each other, and the grate thus formed is sustained on circular piers 53 and 54 of which there are three, the two designated 53 being under the central part of the grate and the outer pier 54 being at the circumference of the grate. The outer or circumferential pier 54 has circular water cup 62 therein, in which dips a skirt 55 forming the water seal between the producer section 16 and the base of the producer. 56 represent air blast or draft current pipes, which enter under the grate between the piers 53 and 54 to supply the draft current respectively to the three chambers formed under the grate by the three piers. By regulating the current in the several pipes the current in the three chambers may be regulated and, in this way, distributed as desired throughout the whole area of the firebed. This distribution is facilitated by the peculiar formation of the grate which with its numerous foraminations insures that the draft reaches every part of the fire.

The openings in the grate are tangential and too small to allow the ash to pass, especially while the draft current is blowing against it: hence the ashes are swept over the grate by the ash beams and the excess ash falls into a radial trough 57 provided for it in the concrete or other base of the producer. A screw 58 is located in this trough to advance the ash outward, the screw carried on a shaft 59 which has suitable bearings under the grate and is rotated by any suitable gear 60. The ash beams continuously fill the trough as fast as the screw clears it. Toward the outer end of the trough 57 the screw 58 is tapered and over this end an inverted dam 61 is formed leading down to the bottom of a metal cup 62$^a$ spanning the trough 57 and forming a continuation of the cup 62 formed in the concrete pier 54. The screw reaches up to or very near the point of the level of the grate.

The cup 62$^a$ has a spillway 62$^b$ into the trough 57, so that the trough is filled to the level of its spillway 57$^a$. The cup section 62$^a$ dips into the water in the trough 57 and makes a seal at this point also. The steady but slow rotation of the screw 58 removes the ashes from the trough as they accumulate by forcing them out through the seal and the ashes may be manually scooped from the outer end of the trough as desired. The screw crowds the ashes under the dam 61 and, packing there, they form an additional barrier to the escape of air pressure from the space under the grate and allowing a comparatively shallow water seal to be effective. To prevent the ash arching in the narrow spaces between the inner or meeting ends of the ash beams, I provide a dog 64 (see Fig. 7) which is located at the side of the trough 57 and strokes up periodically between the beams 50 at the narrow spaces near their inner ends. This dog is operated by a cam disk 65 on a rotary shaft 66 (see Fig. 7) suitably driven (by means not shown).

The operation of the producer will, it is believed, be apparent to persons skilled in the art. The fuel is ignited in the usual way and the rotation of the section 16 causes both the agitator and ash beams to operate. The charging means feed the coal as the rate of gas making requires. The agitator plays vertically on the coal, pressing thereon by its own weight (and additional weight if desired) and harrows the surface of the fire with the result hereinbefore stated. The ash beams, at the same time, sweep over the grate, causing the ash and coal to rotate with the section 16 (and thereby allowing the producer to be constructed of any desired diameter without deterioration in operation) and wiping the excess ash into the trough 57. The ash in the trough which is always full holds up the fire at the point over the trough and the screw 58 is operated continuously or otherwise as to remove the ashes as required.

The modification shown in Fig. 9 contemplates a change in the agitator by which the horizontal member 30$^a$ is carried by a single central stem 31$^a$. This type of agitator is held from excessive rotation by a screw thread 66 on the upper end of the stem 31$^a$ above the top and working on a nut 67 secured to the top, or to a suitable support on or above the same. The twisting effort on the agitator tends to rotate the stem and the screw and nut resist this rotation. But extreme strain causes the screw to raise in the nut, raising the agitator and its attachments in or out of the coal. This, however, relieves the coal strain on the agitator and it then drops back to its former or lower position or near the same. Thus the agitator is automatically kept in a mobile state at its predetermined relative level in or on the surface of the coal, regardless of the varying height of the top of the fuel.

Having thus described my invention what I claim as new and desire to secure by Letters Patent of the United States is:—

1. A gas producer with a rotating lower body section, charging devices on the upper body section, an agitator freely movable, vertically and bearing its weight on the coal, a stationary grate under the lower section, means below the grate to remove the ashes, an arm lying over the grate and moving with the lower section to sweep the ashes over the same and discharge them to the means for removing them, and draft current means discharging through the grate.

2. A gas producer having a rotating wall, a stationary grate, means discharging a draft current through the grate, a beam across the rotating wall and moving over the grate, and an ash pit under and radial of the grate into which the ashes are swept by the beam.

3. A gas producer, having a grate provided with a relatively large ash opening within its outline at the level of the grate, and means relatively rotatable with regard to the grate sweeping over the grate to move the ash over the opening.

4. A gas producer having a grate provided with an opening to the ash pit, the opening being in part of the surface of the grate, means to deliver a forced draft through another part of the grate, and means sweeping over the grate to deliver the ashes to said opening.

5. A gas producer having a grate provided with a relatively large radial opening to receive the ash, means for delivering a forced draft to another portion of the grate, and means for sweeping the ash over the grate into the opening.

6. A gas producer, having a rotating section, a grate under said section having a relatively large ash receiving opening within its outline, and a beam sweeping with said section over the face of the grate to deliver the ash to said opening.

7. A gas producer having a rotating body section to carry the coal and ashes, a grate under the section with an ash outlet, a beam in the lower part of the section and sweeping over the face of the grate, an agitator playing on top of the coal and means for imparting relative horizontal rotation to the agitator and coal.

8. A gas producer having a body to carry the coal and ashes, a grate at the base of the body, a member in the lower part of said body adapted to sweep the grate, an agitator in the body playing freely vertically at the top of the coal and means for causing relative rotary or turning movement between the grate and said member, and the agitator and the coal.

9. A gas producer having a body to carry the coal and ashes, a member in the lower part of the fuel bed to operate on the ashes, means for driving said member, an agitator in the body playing freely vertically at the top of the coal, and means for causing relative rotary or turning movement between the agitator and the coal, said movement being synchronous with the operation of the member to operate on the ashes.

10. A gas producer having a body, charging devices at the upper part thereof, an agitator playing freely vertically on the coal, means to cause relative horizontal travel between the coal and agitator, a stationary grate, means below the grate to remove the ashes, a member overlying the grate and movable to sweep the ashes over the same and discharge them to the ash-removal means and means to operate said member synchronously with the said means to cause relative horizontal travel between the coal and agitator.

11. A gas producer having a body, charging devices at the upper part thereof, an agitator playing freely vertically on the coal, means to cause relative horizontal travel between the coal and agitator, a stationary grate, means below the grate to remove the ashes, a member overlying the grate and movable to sweep the ashes over the same and discharge them to the ash-removal means and means to operate said member, and said ash-removal means synchronously with the said means to cause relative horizontal travel between the coal and agitator.

12. A gas producer having a body to carry the coal and ashes, a grate at the base of the body, a member in the lower part of said body adapted to sweep the grate, an agitator in the body section playing freely vertically at the top of the coal, means for causing relative rotary or turning movement between the grate and said member and the agitator of the coal, and means for removing the ash from below the grate also operating synchronously with the agitator devices.

13. A gas producer having a rotating body section, a grate below it with a radial ash opening, and a beam rotating with the body section and sweeping over the face of the grate, for the purpose specified.

14. A gas producer having a flat grate with an ash discharge opening in it, a beam sweeping over the face of the grate and a rotating exterior producer-wall joined to the beam, for the purpose specified.

15. A gas producer having a grate with an ash discharge opening and a pit below the opening, a rotary body section over the grate, a beam located over the grate to throw the ash into the pit, an agitator playing on top of the coal and means for imparting relative horizontal motion between the agitator and coal and between said beam and the coal.

16. A gas producer having a base with an ash pit in it, a rotary body section above the base, a water seal cup on the base adapted to dip into water in the ash pit to seal it, and a complementary seal member on the body section dipping into the cup.

17. In a gas producer the combination of a flat horizontal grate formed of a number of crooked or bent plates set on and overlapping each other in the same plane with air orifices between them and a member lying over said grate and adapted to sweep the same for the purpose specified.

18. A gas producer having a grate, concentric piers upon which the grate is placed, the piers forming separate draft current chambers between them and means for supplying the draft current to said chambers.

19. A gas producer having piers forming draft current chambers, ash pit walls extending through said chambers, the ash pit not communicating with the draft current chambers, and a grate over the piers and pit and formed with an opening through which the ashes pass to the pit.

20. A gas producer having a grate, a rotary body section above it and cruci-form ash beams attached to the body section and sweeping over the grate.

21. A gas producer with a grate having an ash discharge opening, a rotary body section above the grate, an ash beam extending across the body and sweeping over the face of the grate, and a horizontal agitator playing on top of the coal in said body section.

22. A gas producer having a moving cruci-form ash beam and a dog to periodically stroke between the arms of the beam for the purpose specified.

23. A gas producer, with a substantially flat horizontal grate formed of a number of plates contacting with and over-lapping each other the plates lying in the same plane with air orifices between them and means to sweep over the grate to remove the ashes.

24. A gas producer, with a substantially flat grate formed of a number of plates contacting with and over-lapping each other the plates lying in the same plane with air orifices between them, the grate having a larger orifice for the discharge of the ashes and a member adapted to sweep over the grate and said larger orifice for the purpose specified.

25. A gas producer, with a substantially flat horizontal grate formed of a number of plates contacting with and over-lapping each other the plates lying in the same plane with air orifices between them and a rotary member lying horizontally over the grate and operative to sweep the ashes over the same.

26. A gas producer having a body to carry the coal and ashes, an agitator adapted to lie horizontally on top of the coal in said body, a grate at the base of the body, a member in the lower part of the body and extending over the grate and means for causing relative rotary motion of the agitator and coal and of the grate and said member, said relative rotary motions being in unison with each other and with the rate of gasification of the fuel.

27. A gas producer having a body part for receiving the fuel and a base part having an ash pit therein, a grate supported from said base portion and having a relatively large opening in communication with the ash pit, and means above said grate and adapted to be buried in the lower part of the fuel bed for effecting relative rotation between the ash in said fuel bed and the grate, whereby the ash will drop through the opening into said ash pit.

28. A gas producer having a base part provided with substantially concentric annular piers, a grate supported by said piers, and regulatable forced draft inlets leading respectively to the chambers formed between said piers.

29. A gas producer having a base part provided with substantially concentric annular piers, a grate supported by said piers, and regulatable forced draft inlets leading respectively to the chambers formed between said piers, said grate having an ash receiving opening, and said base part having walls providing an ash pit in communication with said opening.

30. In a gas producer, a grate made up of radiating, overlapping plates with their overlapping parts in contact with each other, said plates having recesses between their overlapping parts to provide radiating air admitting orifices, and a beam sweeping over said grate to remove the ash therefrom.

31. In a gas producer, a grate, an ash sweeping member adapted to be buried in the lower part of the fuel bed adjacent the upper surface of said grate, said grate and said member being relatively rotatable, and said grate being provided with a relatively large ash receiving opening whereby said member sweeps the ash to said opening, an ash pit located beneath said opening, and mechanical means for removing ash from said pit.

In testimony whereof I have hereunto signed my name in the presence of two witnesses.

WILLIAM B. CHAPMAN.

Witnesses:
 GRACE DARLING,
 BRUCE W. CHAPMAN.